Patented Oct. 19, 1926.

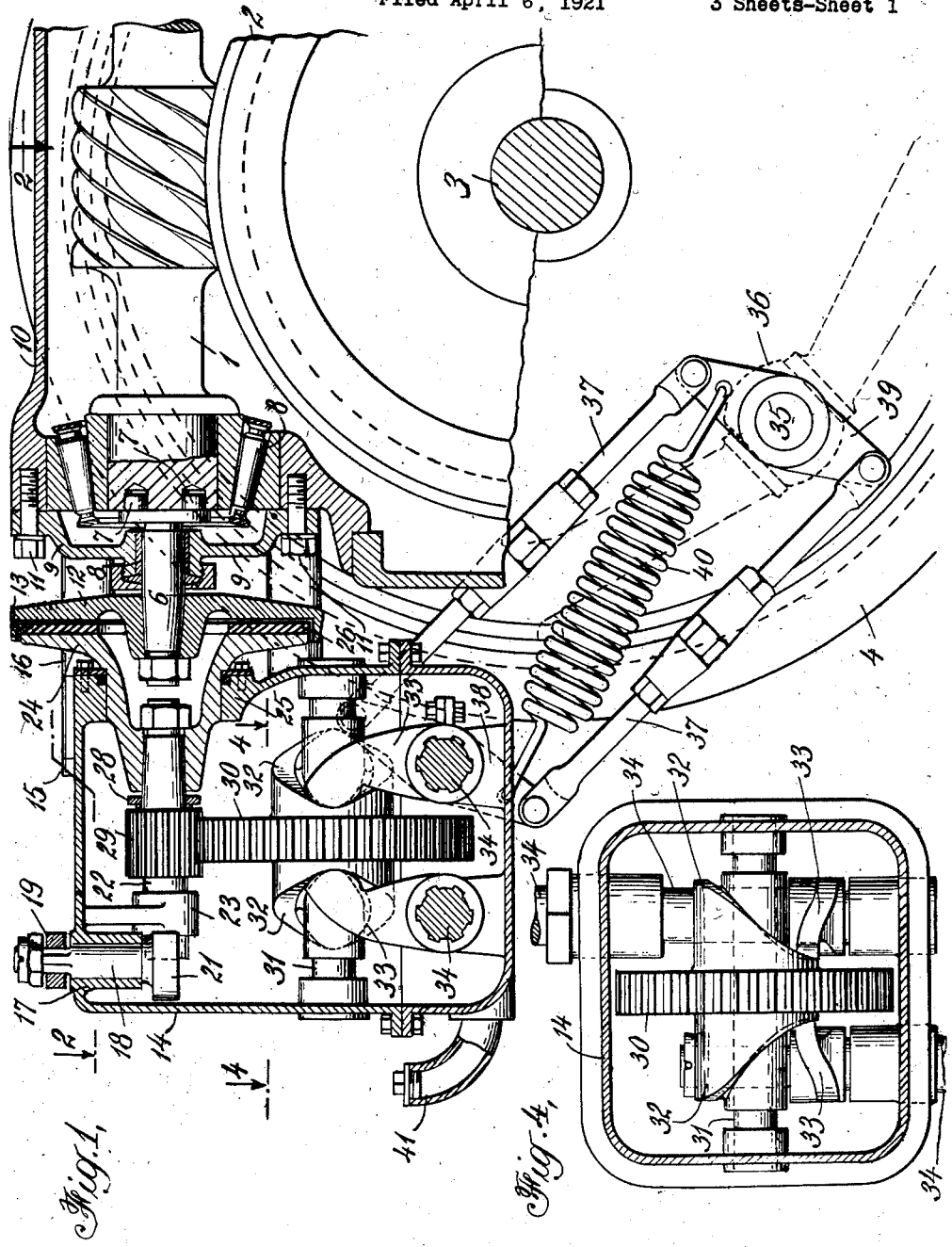

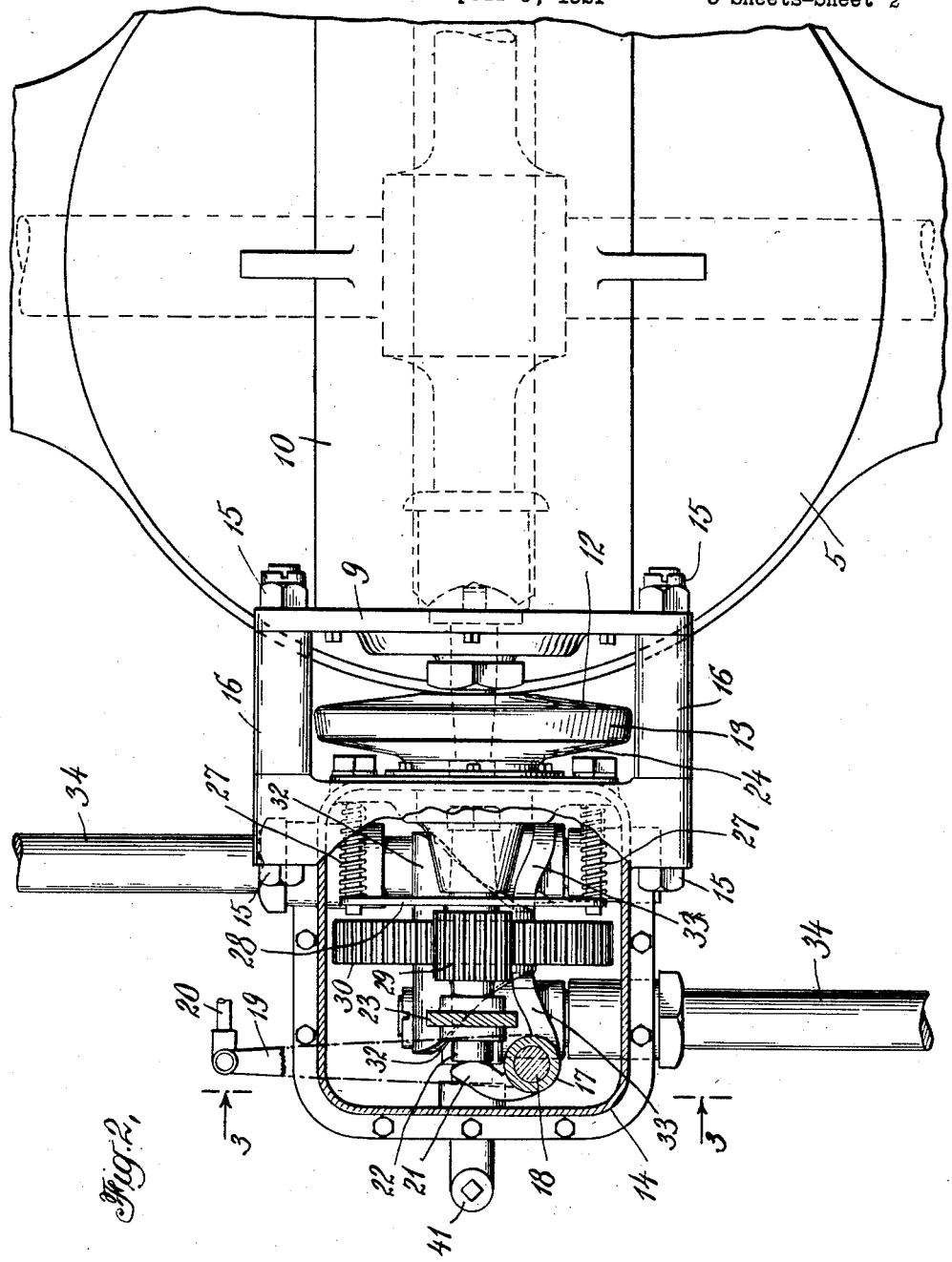

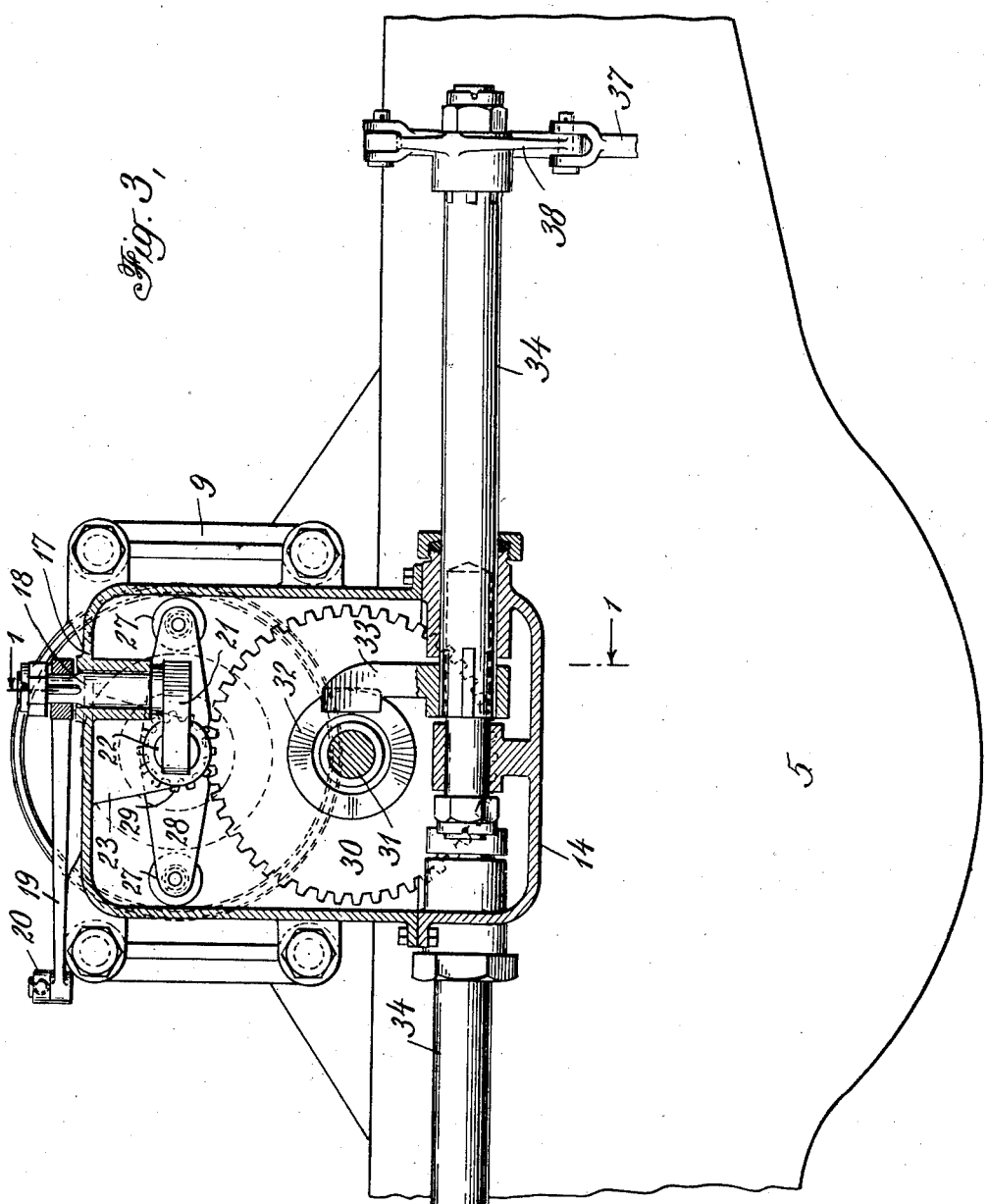

1,603,962

UNITED STATES PATENT OFFICE.

BENJAMIN LIEBOWITZ, OF NEW ROCHELLE, NEW YORK.

BRAKE-SETTING MECHANISM.

Application filed April 6, 1921. Serial No. 458,892.

The invention relates to an improved mechanism for operating the brakes of automotive vehicles and the like.

One of the objects of the invention is to provide a brake setting mechanism which operates to greatly augment the available brake setting energy of the operator by utilizing the kinetic energy of the worm shaft or other rotary member of the vehicle.

A further object is to provide a mechanical brake operating device intermediate the hand lever or foot pedal and the brakes, which device is controlled by operation of the lever or pedal and in turn operates to apply the brakes.

Another object is to provide a mechanism of this character which will equalize the pressures applied to the brakes of a set.

Another object is to provide a mechanism of this character which will function with great reliability, particularly in regard to release.

Another object is to provide a design which will present minimum difficulties in manufacturing.

Another object is to provide a braking mechanism which operates efficiently either when the vehicle is moving forward or in reverse direction.

A still further object is to provide a device which is so constructed as to automatically compensate for wearing of the brake linings.

I attain these objects, as well as others not specifically stated, by means of the construction and arrangement of parts hereinafter described and illustrated in the accompanying drawings, in which:

Figure 1 is a vertical section of a preferred embodiment of the invention, taken on the line 1—1 of Fig. 3.

Fig. 2 is a horizontal section of the same on the line 2—2 of Fig. 1,

Fig. 3 is a transverse sectional elevation on the line 3—3 of Fig. 2, and,

Fig. 4 is horizontal section on the line 4—4 of Fig. 1.

The invention may be employed in connection with any suitable brake construction as the brake, in itself, does not form a part of the invention.

Referring to the drawings, 1 indicates the worm shaft, 2 the worm wheel, 3 the rear axle, 4 a brake drum, and 5 the differential housing of a worm driven motor truck, all of said parts being of usual or conventional construction.

6 indicates a tail piece or extension secured to rotate with the worm shaft. In the embodiment shown, the tail piece 6 is secured to the worm shaft by means of lugs 7 and it is revolubly mounted in a bearing 8 formed in a cap 9 which cap is fastened to the worm shaft housing 10 by means of bolts 11. The outer end of the tail piece carries a flange or plate 12, preferably formed with a rim 13, as shown, to exclude dirt.

A box-like casing 14 is supported on the cap 9 by means of bolts 15 extending through lugs 16 formed on the cap. A vertical bearing 17 is formed in the top of the casing 14 to receive the rock-shaft 18 which shaft is actuated by means of an arm 19 and pivoted rod 20 from the usual brake operating foot pedal or hand lever (not shown). The lower end of the shaft 18 has a finger 21 which abuts against the outer end of a longitudinally movable, horizontally disposed, shaft 22 which shaft is journaled near its outer end in a bearing 23 depending from the top of the casing 14. The shaft 22 has a friction disk 24 fixed to its inner end, the hub of which disk forms a second journal for shaft 22 and is supported in a bearing 25 formed in the inner wall or rear wall of the casing 14. The disk 24 is adapted to be moved axially, by longitudinal movement of its carrying shaft 22, into frictional engagement with the companion plate or flange 12 and it is preferably provided with a suitable friction lining or facing 26. The members 12 and 24 are normally held out of engagement by springs 27, seen in Fig. 2, which springs press against a plate 28 carried on the shaft 22. The springs also serve to automatically restore the disk 24 and shaft 22 to initial position when the brake lever is released. It will be noted, as before pointed out, that the rim 13 of the plate 12 overlaps the edge of the disk 24 and thereby prevents dirt or grit from lodging between said members.

A pinion 29 is formed integral with or fixed to the shaft 22 and meshes with a gear 30 loosely mounted on a shaft 31 whose axis is substantially parallel to that of the shaft 22. The pinion is wider than the gear, as seen in Fig. 2, so as to permit endwise movement of the pinion without disengagement of the parts.

A pair of opposed cams 32—32, having symmetrical faces, are made integral with or are fixed to the gear 30. 33—33 indicate a pair of followers each of which engage one of the cams 32 and is keyed to one of the opposite, transversely extending, rock-shafts 34—34, which shafts operate the brake applying mechanisms of the right and left brakes of the vehicle respectively.

The means for applying the brakes may consist of the usual form of brake cam-shafts 35 carrying brake cams 36. These shafts extend from the brakes inwardly toward the center of the axle. Each of these brake cam-shafts is linked up to the corresponding rock shaft 34 by means of a parallelogram linkage consisting of adjustable rods 37 and rocker arms 38 and 39, the arms 38 being keyed to the rock-shafts 34, and the arms 39 to the cam shafts 35. By this means, angular movement of the shafts 34 is transmitted to the shafts 35 without requiring the use of outboard bearings for shafts 34.

Stretched diagonally between each rocker-arms pair 38—39 is a spring 40, by means of which release of the brakes is effected, as will be explained in greater detail below.

The shaft 31 which supports the gear 30 and the cams 32—32 is fixed in the casing in any suitable manner as, for example, by being pressed into place. The gear-cam unit 30—32—32 is free to rotate on this shaft and to move endwise thereon. It follows that the pressure on the followers 33—33 exerted by the cams 32 must be equal. That is, equalization is secured by the fact that the cam pair 32—32 has endwise freedom of motion with respect to the cam followers 33—33. This is a very important part of the construction.

When the brake setting device is released, in order to disengage the brakes, the springs 40 tend to restore the cam-shafts 35 and rock-shafts 34 and cam unit 30—32—32 to their initial or non-operative positions. In order to insure, however, that this tendency toward restoration will operate reliably, the angle of the face of the cams 32 must be such that its tangent exceeds the coefficient of friction between the cams 32 and their followers. Otherwise it would be necessary to employ a separate spring to effect the angular return of the cam-unit 30—32—32; such a spring, however, would have to be bulky, and would considerably increase the size, weight and cost of the entire mechanism. It is therefore an important part of any invention that the cam angles be properly chosen to exceed the angle of friction.

To increase reliability by reducing the friction between the cams and followers, and at other points where sticking might occur, I prefer to make the casing substantially oil-tight, at least in it lower part, and to use an oil-bath lubrication. An oil inlet 41 is provided for this purpose. If desired, the followers 33 may be equipped with rollers.

When the vehicle is in motion and the hand lever or foot pedal is operated to pull on rod 20, the finger 21 is pressed against the end of shaft 22 and the friction disc 24 is brought into engagement with the rotating plate 12. The disc 24 is thereby dragged around, to rotate the pinion 29, gear 30 and cam 32. This expands the followers, thereby rotating rock-shafts 34, which in turn operates the brake cam-shafts 35 and the brake expander-cam 36 by means of the parallelogram linkages 37—37—38—39.

As the brake-shoes are pressed against the drums 4 they produce a counter-reaction on the cams 36, which is transmitted by the connecting links and shafts and causes a reaction between cams 32 and followers 33. This reaction, acting through the gear and pinion, results in a counter-reaction tending to stop the disc 25 from rotating. When this final reaction becomes equal to the original force by which flange 12 rotated disc 24, further rotation of disc 12 ceases, and slipping occurs between 12 and 24 until the vehicle comes to rest or until the brakes are released. It will be clear from this discussion that the harder the operator pulls on the rod 20, the greater the force with which the flange 12 tends to rotate the disc 24, and finally the greater will be the pressure between the brake drums and brake shoes. It is an important characteristic of my invention, therefore that the braking effort is substantially proportional to the effort exerted by the operator. This characteristic is common to most ordinary forms of automobile brakes, but is not possessed by other forms of power brakes e. g. an air brake or electric brake.

When the main brake linings are new, only a comparatively small movement of the system is necessary to bring the brake shoes into operative contact with their drums. As the linings wear, however, a greater movement is required, and this is taken care of in the device by providing sufficient angular movement of the cams 32. In short, my invention operates to automatically compensate for wear of the brake-shoes by providing increased movement of the system; and no adjustment is required until the linings or shoes are worn out. The maximum angle of rotation of the cams 32 is 180°, and the design should be so laid out that this movement will correspond to the point where the brake linings or shoes are worn out.

When after applying the brakes, the brake-setting operations have been completed and slipping occurs between flange 12 and disc 24, the latter pair act as a brake, in addition to the main brakes, tending to retard the vehicle. In order that the device work efficiently it is essential that the braking effort exerted by the disc flange unit 12—24 be quite small in comparison with the braking effort exerted by the main brakes. And it should be pointed out that the actual braking reaction of the disc-flange unit is multiplied by the worm-gear ratio.

If the design is properly laid out, and suitable materials are employed, the lining 26 should last at least as long as the main brake linings. Since the pressure between flange 12 and disc 24 required to produce a large main braking effort is comparatively small, the lever reduction between the hand-lever or foot pedal and the finger 21 may be made much less than is required for ordinary brakes. The ordinary range of movement of hand-lever or foot pedal will generally be sufficiently large to take care of the full thickness of lining 26 and consequently no adjustment is necessary for the disc-flange unit 12—24, but adjusting means may be introduced if desired.

It is obvious from the symmetry of cams 32 that the brake setting mechanism will operate equally well, whether the vehicle is moving forward or backward, regardless of the particular direction of rotation of the worm-shaft 1.

I have described and illustrated herein a preferred embodiment of the invention but I am aware that various modifications in construction and arrangement may be made without departing from the scope of the invention.

What I claim is:

1. In mechanism of the character described, the combination with the driving wheels of a motor vehicle, the brakes thereof, and a revoluble member arranged to rotate with the driving wheels, of a friction element movable into engagement with said member to rotate frictionally therewith, expanding means including a cam and opposed followers, said cam being movable both angularly and axially, operative connections for moving the cam angularly upon rotation of the friction element, brake applying means actuated by the expanding means to apply the brakes with equal pressure, and resilient means for restoring the expanding means to initial position upon release of the brakes.

2. In mechanism of the character described, the combination with the driving wheels of a motor vehicle, the brakes thereof, and a revoluble member arranged to rotate with the driving wheels, of a friction element movable into engagement with said member to rotate frictionally therewith, expanding means including a cam and opposed followers, said cam having symmetrical faces each formed at an angle which is greater than the angle of repose between the cam and its follower, operative connections for rotating the cam angularly upon rotation of the friction member, brake applying means actuated by the expanding means to apply the brakes with equal pressure, and resilient means for restoring the expanding means to initial position upon release of the brakes.

3. In mechanism of the character described, the combination with the driving wheels of a motor vehicle, the brakes thereof, and a revoluble member arranged to rotate with the driving wheels, of a friction element movable into engagement with said member to rotate frictionally therewith, expanding means including a cam and followers, said cam being operatively connected to rotate with the friction element but at a reduced rate of motion, brake applying means actuated by the expanding means to apply the brakes with equal pressure, and resilient means for restoring the expanding means to initial position upon release of the brakes.

4. In mechanism of the character described, the combination with the driving wheels of a motor vehicle, the brakes thereof, and a revoluble member arranged to rotate with the driving wheels, of a rotary element movable into and out of frictional contact with said revoluble member, means for so moving the said element, a pinion fixed to the rotary element, a cam having engagement with the pinion and axially movable with respect thereto, opposed followers bearing on the cam, and brake applying means actuated by movement of said followers.

5. In mechanism of the character described, the combination with the driving wheels of a motor vehicle, the brakes thereof, and a revoluble member arranged to rotate with the driving wheels, of a rotary element movable into and out of frictional contact with said revoluble member, means for so moving said element, a pinion carried by said rotary element, a cam having engagement with the pinion and axially movable with respect thereto, opposed followers bearing on the cam, rock-shafts carrying said followers, and means actuated by rocking motion of said shafts for setting the brakes.

6. In mechanism of the character described, the combination with the driving wheels of a motor vehicle, the brakes thereof, and a revoluble member, of a rotary friction element movable into and out of contact with said revoluble member, means for so moving said friction element, expanding means actuated by rotation of the friction element, and brake applying means including parallelogram linkage systems operatively connecting the expanding means with the brakes.

7. In mechanism of the character described, the combination of a brake having a shaft, a revoluble member, a rotary friction element movable into and out of engagement with said member, means for so moving said element, expanding means actuated by rotation of the friction element, a brake setting device comprising a parallelogram linkage operatively connecting the expanding means with the brake-shaft, and a spring attached at its ends to the linkage and extending diagonally thereof, said spring operating to restore both the linkage and the expanding means to initial position upon release of the brake.

8. In mechanism of the character described, the combination with a worm-shaft and the housing thereof, of a flange rotatable with the worm-shaft, a rotary friction element movable axially into and out of contact with said flange, a casing supported on the worm-shaft housing and supporting said friction element, expanding means connected with said friction element and disposed within the casing, brake applying means disposed exteriorly of the casing, and shafts extending transversely through the casing and operatively connecting the expanding means and the brake applying means.

9. In mechanism of the character described, the combination with the brakes and the worm-shaft of a motor vehicle, of a disc controllably movable into frictional engagement with said worm-shaft, resilient means normally holding the disc and the worm-shaft disengaged, a pair of cams geared to rotate angularly on rotation of the disc, a pair of rock-shafts, opposed followers carried by the rock-shafts and bearing on the cams whereby to rock said rock-shafts on angular rotation of the cams, and means connecting the rock-shafts with the brakes for applying the brakes when the shafts are rocked.

10. In mechanism of the character described, the combination with the brakes and the worm-shaft of a motor vehicle, of a disc controllably movable into frictional engagement with said worm-shaft, resilient means normally holding the disc and the worm-shaft disengaged, a pair of cams geared to rotate angularly on rotation of the disc and having free axial movement, a pair of rock-shafts, opposed followers carried by the rock-shafts and bearing on the cams whereby to rock the shafts on angular rotation of the cams, means connecting the rock-shafts with the brakes for applying the brakes when the shafts are rocked, and resilient means acting through the rock-shafts and followers to restore the cams to non-operative position when the brakes are released.

11. In a brake setting mechanism for motor vehicles, the combination with a rotating part of the vehicle, of a rotatable member adapted to rotate upon frictional engagement therewith, a cam rotated by said rotatable member, and a plurality of mutually balanced cam followers bearing on the cam whereby the reactions of said cam followers on the cam are equalized.

12. In combination with the brakes and a rotating part of a motor vehicle, a brake setting mechanism comprising a member adapted to engage the rotating part to rotate frictionally therewith, and balanced expanding means actuated by movement of said member to apply the brakes with equalized pressure.

13. In combination with the brakes and a rotating part of a motor vehicle, a brake setting mechanism comprising a member movable into engagement with the rotating part to rotate frictionally therewith, means for controlling said engagement, and balanced expanding means actuated by the frictional rotation of said member to apply the brakes with equalized pressure.

14. In combination with the brakes and a rotating part of a motor vehicle, a brake setting mechanism comprising a member adapted to engage the rotating part so as to rotate frictionally therewith, means for effecting such engagement at will, a cam connected with said member to move angularly upon rotation thereof, followers bearing on the cam, and operative connections between the followers and the brakes, the cam and followers being so arranged as to permit of such differential movement of the followers as may be necessary to compensate for any difference in take-up required to apply the brakes with equalized pressure.

BENJAMIN LIEBOWITZ.